May 31, 1949.　　　R. G. HANNEMAN　　　2,472,012

LIQUID FILTER

Filed Aug. 30, 1946

INVENTOR
ROBERT GORDEN HANNEMAN

BY *Hyde, Meyer, Baldwin & Sloan*

ATTORNEYS

Patented May 31, 1949

2,472,012

UNITED STATES PATENT OFFICE 2,472,012

LIQUID FILTER

Robert Gorden Hanneman, Cleveland, Ohio, assignor to Air-Maze Corporation, Cleveland, Ohio, a corporation of Delaware Application August 30, 1946, Serial No. 693,933

4 Claims. (Cl. 210—185)

This invention relates to improvements in liquid filters more particularly of the type adapted to filter oil such as lubricating oils.

An object of the present invention is to provide a filter which is cheap and easy to construct, efficient in operation, which may be used and cleaned a number of times, but which when thrown away represents the loss of a very small investment.

Another object of the present invention is to provide a filter of novel type for straining very small particles from a liquid.

Other objects and advantages of the invention will be apparent from the accompanying specification and drawings, and the essential features thereof will be set forth in the appended claims.

In the drawings,

Fig. 3 is a transverse sectional view enlarged and exaggerated taken along the line 3—3 of Fig. 2, while

Figure 1:
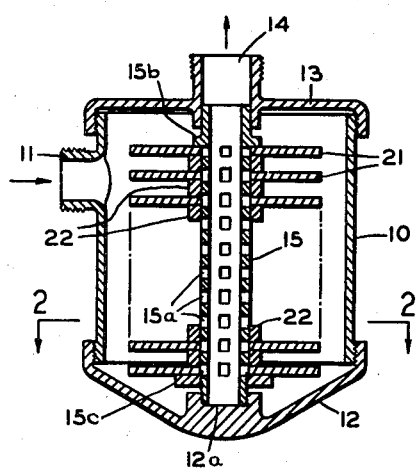
Fig. 1 is a central sectional view through one form of device embodying my invention.
Figure 2:
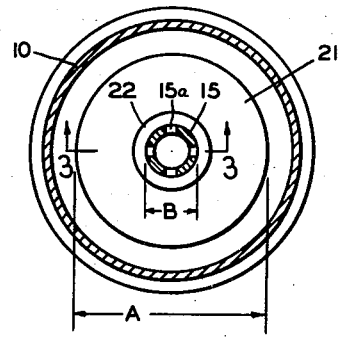
Fig. 2 is a transverse sectional view of the same taken along the line 2—2 of Fig. 1.

In the device of Figs. 1 and 2, a housing 10 is provided with a liquid inlet 11, a bottom closure member 12, and a top cap 13 which is provided with a liquid outlet 14. A central tubular member 15 is provided with suitable perforations 15a for a purpose which will later appear. The upper end of this tubular member is piloted in the outlet conduit 14, and the lower end is held in the cuplike formation 12a on the inner face of the bottom closure member. The details of the housing construction form no part of the present invention, but simply provide means for compelling flow of the liquid through the filtering device about to be described.

Figure 3:
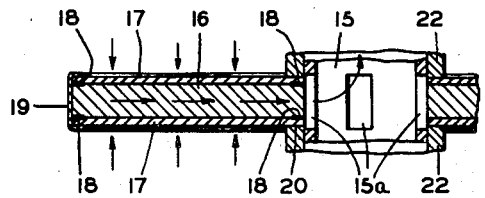

Referring now to Fig. 3, one form of my device comprises an annular disc 16 of porous self-sustaining material such as a porous kraft paper. On the upper and lower surfaces of the base member 16 are secured annular registering discs of very fine grained filter medium, such as a pulp stock and preferably one having a slight water finish. The layers 17 are secured to the base member 16 either by an adhesive applied in spaced spots which will not interfere with the liquid flow, later described, or by gluing the outer and inner peripheries of the annular strips, as indicated at 18, or by binding either the outer or inner peripheries together by means of a grommet 19 which might be of brass, plastic or other similar sheet material, or may be formed of a flowable material such as a commercial gasket-forming material known as Permatex, which is apparently a lacquer combined with a filler, or a heavy lacquer might be used, or a heavy glue to form a binding or sealing rim 19. Obviously such a rim might be applied at 20 if desired.

In any case, means is provided for supporting the layers 17 on the base layer 16 so that they are firmly held together without interfering with the desired flow in the direction of the arrows of Fig. 3.

A plurality of the packs, as shown in Fig. 3 and indicated generally at 21 in Fig. 1, are assembled on the central tube 15 with suitable spacing means between adjacent packs. At the upper end of the tube, there is provided a fixed shoulder 15b between adjacent packs. Spacer rings 22 are provided which also serve when pressure is applied to aid in sealing the inner periphery of each pack at the point 20. When a sufficient number of packs has been assembled on tube 15, a nut 15c is screwed on the opposite end of the tube to hold the packs and spacers tightly together and assembled against the shoulder 15b.

When the parts are assembled, as shown in Fig. 1, and as described in the preceding paragraph, the dirty liquid enters at 11 and passes around the packs entering each one at opposite sides thereof through the layer 17, as indicated in Fig. 3, and then radially inwardly through the porous base member 16 finally passing through the perforations 15a to the interior of tube 15 to the outlet 14.

By properly choosing the material of which the layers 17 are made, one can obtain any desired degree of filtering. I find that with a cheap pulp stock such as the common white scratch pad paper one can remove all particles larger than one-quarter of a micron or less from lubricating or fuel oil. I find also that with a porous kraft paper for the base member 16 that a suitable flow is provided in an oil filter where the dimension A is say three inches, and the dimension B is approximately seven-eighths of an inch. These dimensions are cited merely as representative.

Figure 4:
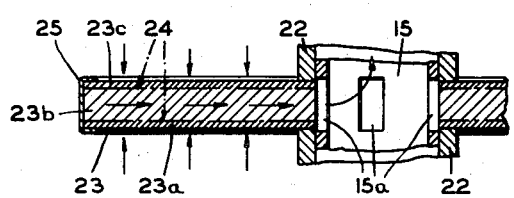
Fig. 4 is a view similar to Fig. 3 showing a modified form of my invention.

In a modified form of my device, as shown in Fig. 4, the composite material of which the packs are made (here indicated generally by the reference character 23) is preferably formed in the paper mill itself, wherein the collecting rolls are first fed a thin layer 23a of the order of five-thousandths of an inch thick of a fair quality of pulp stock, after which a number of layers of porous kraft stock are placed on the paper forming rolls to form the middle layer 23b, approximately five-hundredths of an inch thick, after which a finishing layer 23c is formed on the paper rolls substantially like the layer 23a. This composite sheet is then finished in the usual manner by squeezing the water out and then by drying, so that the entire sheet is a single piece of paper but with definite division lines between the different qualities of paper, as indicated by the dot-dash lines 24 of Fig. 4. The layers 23a and 23c may then receive a water finish by rolling the paper with wet calendering rolls so as to achieve the desired degree of fineness in these layers.

With the paper formed as above described, annular discs 23 may be cut out, sealed at their outer peripheries by a coating 25 of heavy glue, heavy lacquer or similar material, as mentioned in connection with 19 in my first modification. This is for sealing the outer periphery of each disc against the entry of liquid there. These discs are assembled on tube 15 with spacers 22 and with a securing nut 15c, all as described in connection with the first modification. The flow in this case is similar to that mentioned previously, and in the direction of the arrows of Fig. 4. The dirty liquid flows into the housing 10 and through the various packs passing first through the layers 23a or 23c to the porous interior 23b then radially inwardly through openings 15a, tube 15 and outlet 14.

Without changing the inventive concept of the forms of invention described above, the strength and durability of the filter may be improved by treating the fibrous filter material with a resin of a known type adapted to add wet strength to the fibers. Such treatment with a resin can be accomplished without materially detracting from the filtering efficiency of the fibrous elements.

What I claim is:

1. A liquid filter element comprising an annular disk having a stiff self-supporting base portion of very porous paper stock of the order of kraft stock, opposite faces of said disk having a contiguous facing layer of paper having much finer fiber spacing than said base portion and of the order of pulp stock, means sealing the outer periphery of said disk against entrance of liquid there, and means for conducting filtrate away from the inner periphery of said disk.

2. The combination of claim 1 wherein said facing layers have a water finish on the outermost surface thereof.

3. A liquid filter element comprising an annular disk having a base portion of porous kraft paper, registering layers on opposite sides of said base portion formed of pulp stock, means securing said layers directly to said base portion, and means sealing the outer periphery of said disk against entrance of liquid there.

4. A liquid filter element consisting of an annular disk formed of a single sheet of paper stock, said stock having outer layers of pulp stock and inner layers of porous kraft stock, and means sealing the outer periphery of said disk against entrance of liquid there.

ROBERT GORDEN HANNEMAN.

REFERENCES CITED

The following references are of record in the file of this patent:

UNITED STATES PATENTS

| Number | Name | Date |
|---|---|---|
| 853,981 | Kneuper | May 21, 1907 |
| 1,764,660 | Sweetland | June 17, 1930 |
| 2,101,811 | Franzmeier | Dec. 7, 1937 |
| 2,341,414 | Polinka | Feb. 8, 1944 |
| 2,423,547 | Behlen | July 8, 1947 |
| 2,427,733 | McCann | Sept. 23, 1947 |